Jan. 13, 1959  P. L. LINGENFELDER  2,868,573
CARBON HOLDER
Filed Jan. 5, 1956
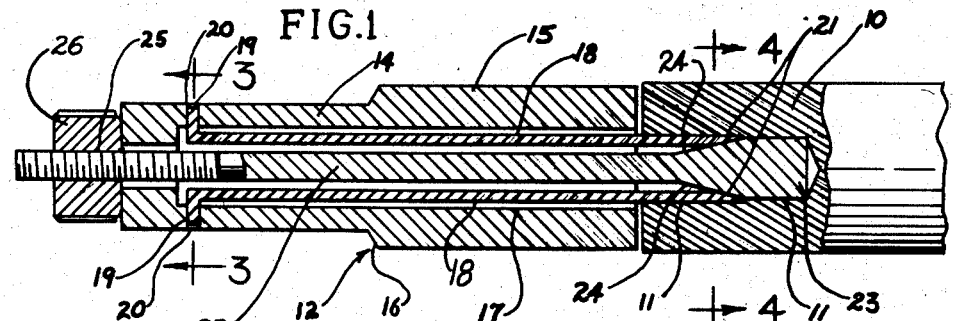
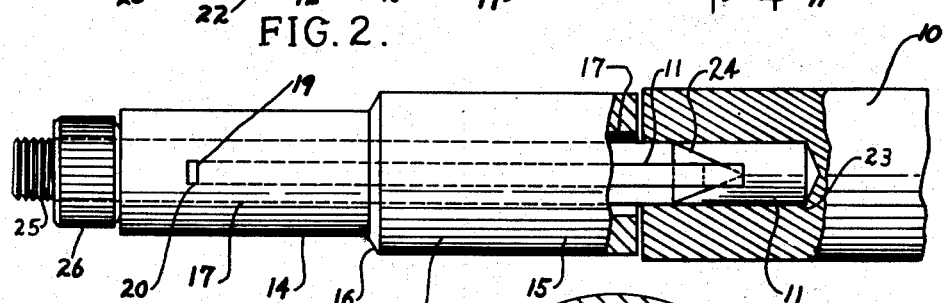
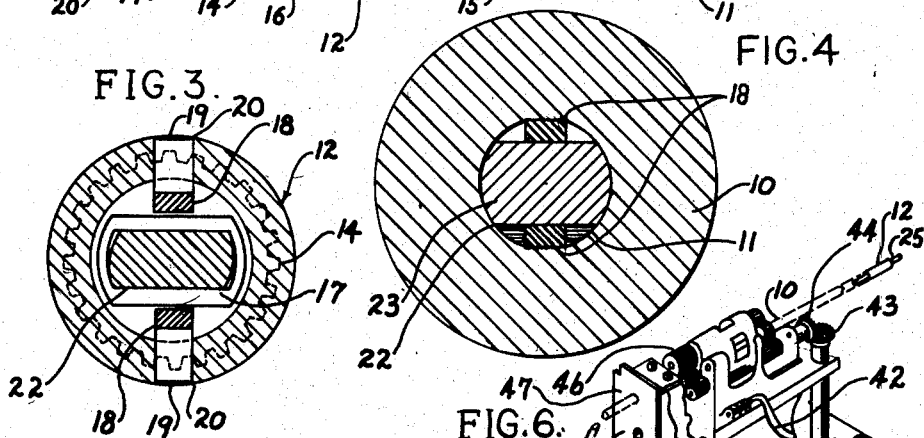
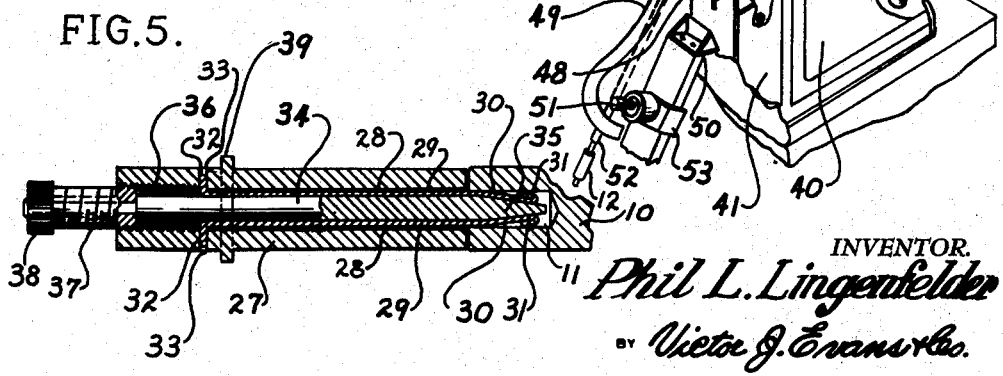
INVENTOR.
Phil L. Lingenfelder
BY Victor J. Evans & Co.
ATTORNEYS United States Patent Office 2,868,573
Patented Jan. 13, 1959

2,868,573

CARBON HOLDER

Phil L. Lingenfelder, Calgary, Alberta, Canada

Application January 5, 1956, Serial No. 557,572

1 Claim. (Cl. 287—119)

This invention relates to a carbon holder, and more particularly to a device for holding carbon that is to be used for providing carbon arc illumination for motion picture projectors or the like.

The object of the invention is to provide a full floating carbon holder which will permit the carbon to be burned or utilized to a greater extent than has been heretofore possible.

Another object of the invention is to provide a carbon holder which serves to releasably grip the carbon body member so that the carbon can be held in proper aligned relation, and whereby the carbon can be burned completely to produce the desired illumination.

A further object of the invention is to provide a carbon holder which is extremely simple and inexpensive to manufacture.

Other objects and advantages will be apparent during the course of the following description.

In the accompanying drawings, forming a part of this application, and in which like numerals are used to designate like parts throughout the same:

Figure 1 is an elevational view of the carbon holder, with parts broken away and in section.

Figure 2 is an elevational view of the device shown in Figure 1 but taken at right angles thereto, and with parts broken away and in section.

Figure 3 is a sectional view taken on the line 3—3 of Figure 1.

Figure 4 is a sectional view taken on the line 4—4 of Figure 1.

Figure 5 is a fragmentary sectional view illustrating a modified carbon holder.

Figure 6 is a perspective view of an arc lamp assembly.

Referring in detail to the drawings, the numeral 10 designates a carbon body member or bar which is provided with an opening 11 that extends inwardly from one end thereof, Figure 1. The present invention is directed to a holder for the carbon body member 10, and the holder comprises a housing which is indicated generally by the numeral 12, and the housing 12 can be made of any suitable material. The housing 12 includes a first section 14 and a second section or portion 15, the portions 14 and 15 being of different diameters so as to define therebetween a shoulder 16. The housing 12 is provided with a longitudinally extending bore or opening 17 for a purpose to be later described.

Extending through the bore 17 is a pair of spaced apart arms 18 and extending outwardly from an end of each of the arms 18 is a transverse outwardly extending finger 19. The fingers 19 project into cutouts or slots 20 which are arranged in the housing 12. Extending longitudinally through the housing 12 is a flat shank or stem 22 which is provided with an enlarged head 23 on one end thereof. Arranged contiguous to the head 23 is a tapered portion 24 which is engaged by the beveled or tapered surfaces 21 on the arms 18. The shank 22 is further provided with an exteriorly threaded portion 25, and a nut 26 is arranged in threaded engagement with the threaded portion 25.

Referring to Figure 5 of the drawings, there is shown a modified holder for gripping the carbon body member 10, and the modified holder shown in Figure 5 includes a housing 27 which is provided with a longitudinally extending bore 28. Spaced apart arms 29 extend through the bore 28, and the arms 29 each include an inwardly offset or inclined section 30 which terminates in an outwardly projecting lug 31. The sections 30 and lugs 31 are arranged in the opening 11 in the carbon body member 10, and the lugs 31 engage the adjacent surfaces of the carbon bar 10. The other end of each of the arms 29 is shaped to include an outwardly extending transverse finger 32, and the fingers 32 project into slots or cutouts 33 in the housing 27. Extending through the housing is a shank or stem 34 which includes a conical or tapering end 35 which engages the inclined sections 30 of the arms 29.

The housing 27 is further provided with an interiorly threaded portion 36 which threadedly receives a threaded section or bushing 37, and a nut 38 is arranged contiguous to the bushing 37. A flange or shoulder 39 is provided on the outer portion of the housing 27 for a purpose to be later described.

In use the carbon 10 can be ignited in the usual manner and the carbon 10 can be held by the device shown in the drawings. As shown in Figures 1 through 4 the head 23 of the shank 22 projects into the opening 11 in the carbon body member 10. Then, by properly rotating the nut 26, the tapered surfaces 21 will wedge against the inclined surfaces 24 so that the longitudinal shifting movement of the shank 22 will cause the ends of the arms 18 to dig into the surfaces of the carbon 10 whereby the carbon 10 will be securely held attached to the housing 12.

In Figure 5 there is shown a modification which is constructed so that by rotating the bushing 37, the conical end 35 will expand the offset sections 30 to thereby cause the lugs 31 to dig into the carbon 10 to releasably connect the carbon 10 and housing 27 together.

The device of the present invention is especially suitable for use with arc lamps in motion picture projectors. The device can be used on a rotating carbon since it has a locking device.

Heretofore, rigid or split ends have been provided in carbon bars, but it has been found that this is not practical since often the core of a carbon is not centered, or the hole is not drilled properly with respect to the horizontal axis of the carbon. Thus, with the present invention when locked onto the carbon, there will be no wobbling. With prior devices, there was often wobbling so that when the carbon hits the feed rollers, the pressure on the feed rollers will crack out the edge of the carbon so that rotation of the carbon will be prevented. The present invention is a full floating as well as self-aligning arrangement since there is a clearance between the housing 12 and the shaft 22 which fits in the carbon 10. When the nut 26 is tightened, there is an additional clearance between the arms 18 and head 23. As shown in Figure 1, the diameter of the housing 12 is less than the diameter of the carbon 10 so that there is compensation for any cores which may not be true or of the proper size.

The full floating action is made possible by the provision of the head 23 which is of the same size as the opening 11 in the carbon 10. Thus, when the nut 26 is tightened the ends of the arms 18 cut a spline in the carbon 10 and as the arms 18 expand, there will be a tendency to cut the spline deeper when the carbon gets hot. Since the fingers 19 project into the openings 20 with sufficient clearance, the housing 12 will be able to center itself when entering the feed rollers. The section 14 is of smaller diameter than the section 15 so as to provide the shoulder 16 and this feature is important since it stops the positive carbon from feeding beyond the arc lamp silver contacts. Thus, should the carbon go beyond this point, there is a possibility of a flash and damage to the silver contacts. The housing 12 and arms 18 are free floating or readily movable with respect to each other.

The device of the present invention can be used on any positive or negative carbons as for example on various 35 mm. projection arc lamps and also in any spot lamps using carbons for light source. The present invention permits the carbon to be burned much shorter without damage to the arc lamp. Recently, manufacturers of projection lamps have adopted a rotating carbon wherein electrical contact is made to the carbon through a silver metal block in the form of a semicircle with a top and bottom piece with a continuous tension between the two blocks, and with the carbon feeding through the center of the block. This naturally has eliminated all carbon holders which were adapted to clamp on the outside of the carbon. The present invention is constructed so that by drilling the soft core 11 out of the center of the carbon to a depth of ½ inch, the head 23 can be inserted and then the wedge can be tightened which will lock the carbon to the housing. By turning the unit 26, the ends of the arms 18 will be expanded into engagement with the carbon 10.

The two different forms of the invention shown in Figures 1 through 4 and in Figure 5 are provided so that the device will fit different lamp houses but of course the principle of the locking mechanism to the carbons is the same in both constructions. In Figures 1 through 4 the head 23 effects a pulling action to effect the wedging. In Figure 5 movement of the bushing 37 results in a pushing action which forces the lugs 31 into the carbon 10. The smaller diameter section 14 provides a safetly factor since when the feed rollers on the lamp housing reach the shoulder 16 they automatically stop feeding. The flange member 39 shown in Figure 5 serves as a stop member. The nut 26 may be a round splined cut nut.

One of the important features of the present invention is the mechanism which permits locking of the flat shank to the housing. Any suitable machine or mechanism can be used for drilling a hole or core in the carbon.

Referring to Figure 6 of the drawings, there is shown an arc lamp assembly which is indicated generally by the numeral 40, and the assembly 40 includes a contact support casing 41, a positive carbon release handle 42, a vertical drive shaft gear 43, and a horizontal drive shaft gear 44. The carbon saver or holder of the present invention is shown mounted in the arc lamp assembly 40, and the numeral 10 designates the positive carbon. The numeral 46 designates the positive drive rollers and casting assembly while the numeral 47 designates the positive silver contact top. There is further provided a positive heat baffle 48, an air nozzle 49, and a negative heat baffle and ash receiver 50. The numeral 51 designates the negative carbon clamp screw, while the numeral 52 designates the negative carbon, and the numeral 53 indicates the negative carbon carriage or carbon holder.

I claim:

In a full floating self-aligning holder for a carbon body member having an opening extending inwardly from an end thereof, a housing arranged in end to end relation with respect to said body member and including first and second sections of different diameters, there being a longitudinally extending bore in said housing, said bore including a first portion and a second portion of reduced diameter, spaced apart arms extending through the first portion of said bore and each including a beveled inner portion, there being opposed cutouts in the second section of said housing, transverse fingers extending outwardly from said arms and projecting through said cutouts, a shank extending through said bore and having an enlarged head on its inner end seated in the opening in said carbon body member, said head including a tapered surface engaged by the beveled end portions of said arms, said shank further including an exteriorly threaded portion, and a nut arranged exteriorly of said housing and threadedly engaging the threaded portion of said shank.

References Cited in the file of this patent

UNITED STATES PATENTS

| | | |
|---|---|---|
| 1,958,981 | Wilczek | May 15, 1934 |
| 1,959,008 | Spaloss | May 15, 1934 |